(12) United States Patent
Ikemoto et al.

(10) Patent No.: US 6,552,128 B2
(45) Date of Patent: Apr. 22, 2003

(54) RUBBER COMPOSITION

(75) Inventors: Ayumu Ikemoto, Komaki (JP); Koji Senda, Niwa-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/968,611

(22) Filed: Oct. 2, 2001

(65) Prior Publication Data

US 2002/0068797 A1 Jun. 6, 2002

(30) Foreign Application Priority Data

Oct. 3, 2000 (JP) ........................................ 2000-304079
Jan. 25, 2001 (JP) ........................................ 2001-017536

(51) Int. Cl.⁷ .......................... C08F 8/00; C08L 35/08; C08L 9/00; C08L 23/04; C08L 25/02
(52) U.S. Cl. ...................... 525/194; 525/191; 525/192; 525/217; 525/232; 525/240; 525/241
(58) Field of Search ............................... 525/191, 192, 525/194, 217, 232, 240, 241

(56) References Cited

U.S. PATENT DOCUMENTS

| | | | |
|---|---|---|---|
| 4,101,478 A | 7/1978 | Kostjuchenko et al. | 260/23 |
| 4,633,912 A * | 1/1987 | Pilkington et al. | 138/132 |
| 4,652,475 A | 3/1987 | Haney et al. | 428/36 |

FOREIGN PATENT DOCUMENTS

| | | |
|---|---|---|
| DE | 42 32 946 | 4/1993 |
| EP | 1 074 777 | 2/2001 |
| JP | 58-132542 | 8/1983 |

OTHER PUBLICATIONS

European Search Report dated Feb. 22, 2002.

* cited by examiner

Primary Examiner—Nathan M. Nutter
Assistant Examiner—Thao Tran
(74) Attorney, Agent, or Firm—Armstrong, Westerman & Hattori, LLP

(57) ABSTRACT

A rubber composition which can achieve superior adhesion force between it and a material to be adhered without a coating of an adhesive. The rubber composition includes the following components (A) to (D): (A) a rubber composed of at least one of an ethylene-propylene-diene terpolymer and an ethylene-propylene copolymer, (B) a peroxide vulcanizing agent, (C) a resorcinol-based compound, and (D) a melamine resin.

5 Claims, 1 Drawing Sheet

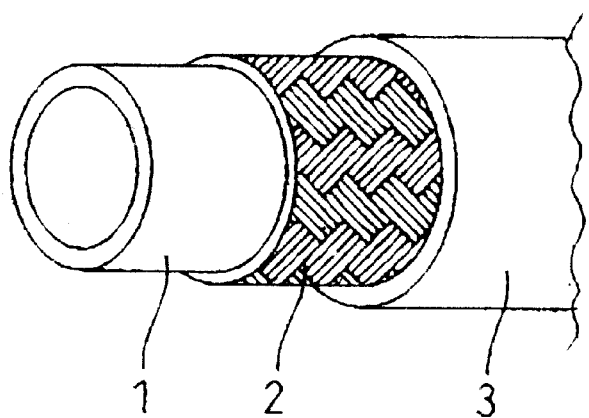
Figure   PRIOR ART

RUBBER COMPOSITION

BACKGROUND OF THE INVENTION

1. Field of the Invention

The present invention relates to a rubber composition. In particular, the present invention relates to a rubber composition suitable for automobile hoses, for example, gasoline fuel hoses, fuel-cell vehicle hoses (methanol fuel hoses and hydrogen fuel hoses), engine cooling system hoses (radiator hoses, heater hoses, etc.), and refrigerator coolant transport hoses.

2. Description of the Art

Hitherto, in vehicles such as automobiles, engine cooling system hoses, such as radiator hoses used for connection of engines and radiators, and heater hoses used for connection of engines and heater cores, for example, such as shown in the FIGURE have been used. This hose is composed of an inner rubber layer 1, a reinforcement layer 2, and an outer rubber layer 3. The aforementioned hose is produced by the steps of braiding reinforcement fibers on an outer peripheral surface of the inner rubber layer 1 so as to form the reinforcement layer 2, coating the surface thereof with an adhesive, forming the outer rubber layer 3 thereon, and vulcanizing. The interface between the inner rubber layer 1 and the reinforcement layer 2 may be coated with the adhesive.

However, regarding the aforementioned conventional hose, since the reinforcement layer 2 and the inner rubber layer 1, or the reinforcement layer 2 and the outer rubber layer 3, are adhered using an adhesive, there may be a problem in that adhesive force between the reinforcement layer 2 and the inner rubber layer 1, or the reinforcement layer 2 and the outer rubber layer 3, is insufficient due to unevenness in the coating of the adhesive, etc., and therefore, sealing performance is insufficient. Furthermore, since the step of applying a coating of the adhesive is necessary, there are problems in that the manufacturing process is complicated which thereby increases costs. Additionally, the pot life of the adhesive is a concern, and the concentration of the adhesive must be controlled, and as a consequence, stability in productivity may be degraded. In addition, since an organic solvent, for example, toluene, is used as a dilution solvent for the adhesive, there are problems of environmental pollution, etc.

As the materials for forming the aforementioned inner rubber layer 1 or outer rubber layer 3, sulfur-vulcanized rubber compositions including an ethylene-propylene-diene terpolymer (EPDM) as a base material typically have been used. In this sulfur-vulcanized rubber composition, it has been required to blend zinc oxide (zinc white) as a vulcanization accelerating aid. However, the aforementioned zinc oxide is present in the form of zinc salts in the vulcanized material after the vulcanization reaction of the rubber composition. Then, these zinc salts gradually migrate to the surface of the vulcanized material, so that they are eluted into a cooling liquid. Once in the cooling liquid, the zinc salts may react with phosphoric acid components contained in the cooling liquid so as to produce insoluble compounds. As a consequence, problems occur since the insoluble compounds deposit on the inner wall surface of the hose and may cause the hose to clog, and the compounds also deposit at the seal portion between the hose and a connection pipe so as to cause leakage of the cooling liquid.

SUMMARY OF THE INVENTION

The present invention was made in consideration of the aforementioned circumstances. Accordingly, it is an object of the present invention to provide a rubber composition which can achieve superior adhesion force between it and a material to be adhered without a coating of an adhesive.

In order to achieve the aforementioned object, a rubber composition according to the present invention includes the following components (A) to (D):

(A) a rubber composed of at least one of an ethylene-propylene-diene terpolymer and an ethylene-propylene copolymer, (B) a peroxide vulcanizing agent, (C) a resorcinol-based compound, and (D) a melamine resin.

The inventors of the present invention earnestly researched in order to omit the step of applying a coating of the adhesive, and conceived of the concept of kneading an adhesive component into the rubber composition. Therefore, further research was performed regarding the combinations of rubbers and adhesive components which have superior adhesion properties. As a result, EPDM and an ethylene-propylene copolymer (hereafter abbreviated as EPM), which were relatively low cost among rubber materials, were considered, and it was discovered that when specific adhesive components, i.e., a resorcinol-based compound and a melamine resin, were kneaded into the aforementioned copolymer, and these components were vulcanized using a peroxide vulcanizing agent, superior adhesive force between the copolymer and a material to be adhered could be achieved, and thus the present invention was realized. The reason the rubber composition according to the present invention has superior adhesive force between it and a material to be adhered thereto is believed to be as described below. That is, it is believed that the aforementioned resorcinol-based compound primarily functions as an adhesive, and the aforementioned melamine resin primarily functions as an adhesive adjuvant, and since the resorcinol-based compound is provided with $CH_2O$ from the melamine resin, this makes a covalent bond with the material to be adhered so as to improve the adhesive force. For example, it is believed that the resorcinol-based compound (C) represented by the following general formula (I) is provided with $CH_2O$ from the melamine resin so as to have a structure represented by the following general formula (II), and this structure forms a covalent bond with a polyamide bond (—CONH—) of the material to be adhered (for example, a polyamide resin), as is shown by the following reaction formula (III), so as to adhere firmly thereto. Furthermore, a portion of hydroxyl groups of the resorcinol-based compound forms hydrogen bonds with the material to be adhered (for example, a polyamide resin), and it is believed that these hydrogen bonds also contribute to improve the adhesive effect.

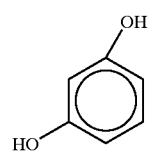

(I)

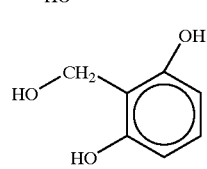

(II)

-continued

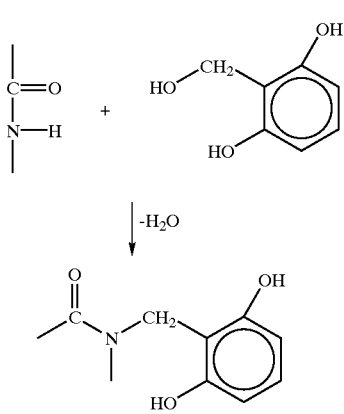

When the weight ratio of the resorcinol-based compound (C) to the melamine resin (D) is within a specified range, the adhesive force between the rubber composition and the material to be adhered is improved further.

When the weight ratio of the resorcinol-based compound (C) relative to the specified rubber (A) is within a specified range, the adhesive force between the rubber composition and the material to be adhered also is improved.

BRIEF DESCRIPTION OF THE DRAWING

The sole FIGURE of the drawing is a perspective view of a conventional hose for an engine cooling system.

DESCRIPTION OF THE PREFERRED EMBODIMENTS

Embodiments according to the present invention will be explained below in detail.

The rubber composition according to the present invention can be produced using a specified rubber (A component), a peroxide vulcanizing agent (B component), a resorcinol-based compound (C component), and a melamine resin (D component).

As the aforementioned specified rubber (A component), at least one of an ethylene-propylene-diene terpolymer (EPDM) and an ethylene-propylene copolymer (EPM) is used. The EPDM is not specifically limited, as long as it is used as a base material of a rubber composition, although iodine number thereof is preferably within the range of 6 to 30, and the ethylene ratio thereof is preferably within the range of 48% to 70% by weight, and more preferably, the iodine number thereof is within the range of 10 to 24, and the ethylene ratio thereof is within the range of 50% to 60% by weight.

As the diene monomer (a third component) contained in the EPDM, although not specifically limited, diene monomers having a carbon number of 5 to 20 are preferable, and examples thereof include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methacryl-5-norbornene, and 2-isopropenyl-5-norbornene. Among these diene monomers, dicyclopentadiene (DCP) and 5-ethylidene-2-norbornene (ENB) are preferable.

Examples of the peroxide vulcanizing agent (B component) used together with the aforementioned specified rubber (A component) include 2,4-dichlorobenzoyl peroxide, benzoyl peroxide, 1,1-di-t-butyl peroxy-3,3,5-trimethylcyclohexane, 2,5-dimethyl-2,5-dibenzoyl peroxyhexane, n-butyl-4,4'-di-t-butyl peroxyvalerate, dicumyl peroxide, t-butyl peroxybenzoate, di-t-butyl peroxy-diisopropylbenzene, t-butyl cumyl peroxide, 2,5-dimethyl-2,5-di-t-butyl peroxyhexane, di-t-butyl peroxide, and 2,5-dimethyl-2,5-di-t-butyl peroxyhexyne-3. These agents may be used alone, or at least two of these agents may be used concurrently. Among these, di-t-butyl peroxy-diisopropylbenzene is preferably used because there is no problem of odor.

The weight ratio of the aforementioned peroxide vulcanizing agent (B component) is preferably within the range of 1.5 to 20 parts by weight (hereafter abbreviated as parts) relative to 100 parts of the aforementioned specified rubber (A component). That is, when the weight ratio of the B component is less than 1.5 parts, cross-link may be insufficient, and strength of the rubber in use as hose material may be reduced. On the other hand, when the weight ratio of the B component exceeds 20 parts, the rubber may become excessively hard, and thus its flexibility in use as hose material tends to be degraded.

As the resorcinol-based compound (C component) used together with the above-described A component and the B component, such is not specifically limited as long as it primarily functions as an adhesive. For example, modified resorcinol-formaldehyde resins, resorcin, resorcinol-formaldehyde resins (RF) are suitable. These may be used alone, or at least two of these may be used concurrently. Among these, in consideration of its low transpiration and low moisture adsorption properties, and compatibility with rubber, modified resorcinol-formaldehyde resins preferably are used.

Examples of the modified resorcinol-formaldehyde resins include resins represented by the following general formulae (1) to (3). Among these, the resin represented by the following general formula (1) is especially preferable.

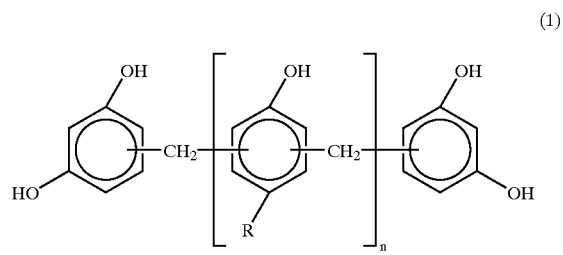

wherein R represents a hydrocarbon group, and n represents a number of 0 to 3.

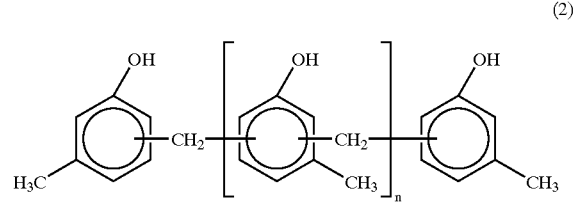

wherein n represents a number of 0 to 3.

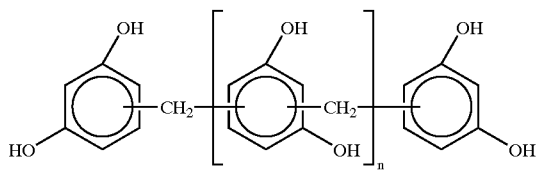

(3)

wherein n represents a number of 0 to 3.

The weight ratio of the aforementioned resorcinol-based compound (C component) is preferably within the range of 0.1 to 10 parts relative to 100 parts of the aforementioned specified rubber (A component), and more preferably, is within the range of 0.5 to 5 parts. That is, when the weight ratio of the C component is less than 0.1 parts, adhesion property to the material to be adhered tend to be degraded, on the other hand, when the weight ratio of the C component exceeds 10 parts, costs tend to be increased.

As the melamine resin (D component) used together with the A to C components, such is not specifically limited as long as it primarily functions as an adhesion adjuvant. For example, methylated compounds of formaldehyde-melamine polymers, and hexamethylenetetramine are suitable. These may be used alone, or at least two of these may be used concurrently. Among these, in consideration of its low transpiration and low moisture adsorption properties, and compatibility with rubber, methylated compounds of formaldehyde-melamine polymers preferably are used.

As the methylated compound of formaldehyde-melamine polymer, for example, compounds represented by the following general formula (4) are preferably used.

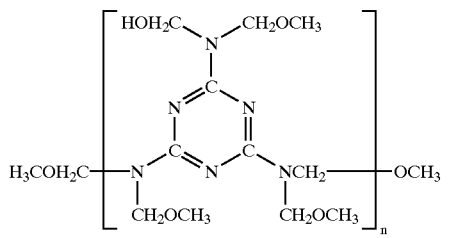

(4)

wherein n represents a positive number.

Among the preferable melamine resins (D component) represented by the aforementioned general formula (4), a mixture of 43% to 44% by weight of compound in which n=1, 27% to 30% by weight of compound in which n=2, and 26% to 30% by weight of compound in which n=3 is especially preferable.

The weight ratio of the resorcinol-based compound (C component) to the melamine resin (D component), C component/D component, is preferably within the range of 1/0.5 to 1/2, more preferably, is within the range of 1/0.77 to 1/1.5. That is, when the weight ratio of the D component is less than 0.5, ordinary state properties, such as tensile strength at break (TB) and elongation at break (EB), tend to be slightly degraded. On the other hand, when the weight ratio of the D component exceeds 2, adhesion property is not improved any more and adhesive force is stabilized, so that even if the weight ratio of the D component is increased even more, further effects cannot be expected in spite of an increase in cost.

In addition to the aforementioned A to D components, carbon black, process oil, etc., are preferably compounded in the rubber composition according to the present invention.

In addition to the aforementioned components, if necessary, an antioxidant, a processing aid, a cross-linking accelerator, a white filler, a reactive monomer, a foaming agent, etc., may be appropriately compounded in the rubber composition according to the present invention.

The rubber composition according to the present invention can be prepared by the steps of compounding the aforementioned A to D components and, if necessary, other components, and kneading these using a kneading machine, for example, a roll mixer, a kneader, or a Banbury mixer.

The rubber composition according to the present invention prepared as described above can be used for automobile hoses, for example, gasoline fuel hoses, fuel-cell vehicle hoses (methanol fuel hoses and hydrogen fuel hoses), engine cooling system hoses in vehicles such as automobiles, e.g., radiator hoses used for connection of engines and radiators, and heater hoses used for connection of engines and heater cores, and refrigerator coolant transport hoses, as well as rubber vibration insulators, accumulators, etc. Since EPDM has inferior gasoline resistance, when the rubber composition according to the present invention is used for the gasoline fuel hose, it is desirable that this material be used for other than the inner layer.

Next, Examples will be explained together with Comparative Examples.

EXAMPLE 1

100 parts of EPDM [ESPRENE 501A, manufactured by Sumitomo Chemical Co., Ltd., iodine number of 12, ethylene ratio of 50% by weight, Mooney viscosity of 43 (ML1+4 100° C.) as a specified rubber (A component), 100 parts of carbon black (SEAST SO, manufactured by Tokai Carbon Co., Ltd.), 60 parts of process oil (Diana process PW-380, manufactured by Idemitsu Kosan Co., Ltd.), 4.2 parts of di-t-butyl peroxy-diisopropylbenzene (Peroximon F-40, manufactured by NOF CORPORATION) as a peroxide vulcanizing agent (B component), 1 part of modified resorcinol-formaldehyde resin (Sumikanol 620, manufactured by Sumitomo Chemical Co., Ltd.) represented by the aforementioned general formula (1) as a resorcinol-based compound (C component), and 0.77 parts of methylated compound of formaldehyde-melamine polymer (Sumikanol 507A, manufactured by Sumitomo Chemical Co., Ltd.) as a melamine resin (D component) were compounded, and were kneaded using a roll mixer so as to prepare a rubber composition.

EXAMPLE 2

A rubber composition was prepared in a manner similar to that of Example 1, except that the amount of Sumikanol 620 was changed to 5 parts, and the amount of Sumikanol 507A was changed to 3.85 parts.

EXAMPLE 3

A rubber composition was prepared in a manner similar to that of Example 1, except that the amount of Sumikanol 620 was changed to 10 parts, and the amount of Sumikanol 507A was changed to 3.85 parts.

EXAMPLE 4

A rubber composition was prepared in a manner similar to that of Example 1, except that the amount of Sumikanol 507A was changed to 0.5 parts.

EXAMPLE 5

A rubber composition was prepared in a manner similar to that of Example 1, except that the amount of Sumikanol 507A was changed to 2 parts.

EXAMPLE 6

A rubber composition was prepared in a manner similar to that of Example 1, except that the amount of Sumikanol 620 was changed to 0.1 parts, and the amount of Sumikanol 507A was changed to 0.05 parts.

EXAMPLE 7

A rubber composition was prepared in a manner similar to that of Example 1, except that EPM (ESPRENE 201, manufactured by Sumitomo Chemical Co., Ltd.) was used instead of EPDM (ESPRENE 501A, manufactured by Sumitomo Chemical Co., Ltd.).

Comparative Example 1

A rubber composition was prepared in a manner similar to that of Example 1, except that Sumikanol 620 and Sumikanol 507A were not compounded.

Comparative Example 2

A rubber composition was prepared in a manner similar to that of Example 1, except that Sumikanol 507A was not compounded.

Comparative Example 3

A rubber composition was prepared in a manner similar to that of Example 1, except that Sumikanol 620 was not compounded, and the amount of Sumikanol 507A was changed to 1 part.

Comparative Example 4

A rubber composition was prepared in a manner similar to that of Example 1, except that vulcanization accelerators, that is, 0.75 parts of tetramethylthiuram disulfide (Sanceler TT, manufactured by Sanshin Chemical Industry Co., Ltd), 0.75 parts of zinc dimethyldithiocarbamate (Sanceler PZ, manufactured by Sanshin Chemical Industry Co., Ltd), 0.5 parts of mercaptobenzothiazole (Sanceler M, manufactured by Sanshin Chemical Industry Co., Ltd), and 1.5 parts of sulfur (vulcanizing agent), were compounded instead of 4.2 parts of peroxide vulcanizing agent (B component).

Evaluation of each of the following properties was performed using the rubber compositions of Examples and Comparative Examples prepared as described above based on the following criteria. The results thereof are summarized as shown in Table 1 and Table 2 described below.

Tensile Strength at Break (TB) and Elongation at Break(EB)

The aforementioned rubber composition was press-vulcanized at 160° C. for 45 minutes so as to produce a vulcanized rubber sheet of 2 mm in thickness. A JIS No. 5 dumbbell specimen was punched out, and TB and EB thereof were evaluated in conformity with JIS K 6251. The TB and the EB become more desirable with an increase in values.

Adhesion Property

Reinforcement fibers (nylon fibers) were tightly wound around a flexible metal piece of 2 mm in thickness and 100 mm square in one direction so as to form reinforcement fiber layers, and the wound reinforcement fibers were neatly aligned and restrained at one end in the direction of the winding so as to make a gripper margin. An unvulcanized stock of 2.2 mm in thickness and 100 mm square of the aforementioned rubber composition was placed on the reinforcement fiber layers formed on the aforementioned flexible metal piece, and press vulcanization was performed at 160° C. for 45 minutes so as to adhere the rubber layer to the reinforcement fiber layers. Thereafter, the end portion of the wound reinforcement fibers was cut off so as to remove the flexible metal piece, and cooling to room temperature was performed. Then a test piece of 25 mm in width and 100 mm in length for evaluation of adhesion was cut from the laminate of the rubber layer and the reinforcement fiber layers, the gripper margin being included. The test piece was placed on a tensile tester (JIS B 7721), and the reinforcement fiber layers side was pulled at a rate of 50 mm per minute, while the rubber layer side was fixed, so as to evaluate the adhesive force (kg/25 mm). At that time, peeling status of the rubber layer and the reinforcement fiber layers was visually observed. A test piece in which destruction of the rubber layer was observed is indicated by a symbol ○ in the Tables, and a test piece in which peeling at the interface was observed is indicated by a symbol × in the Tables. Regarding the rubber composition of Comparative example 1, evaluation of the adhesion property was performed on a test piece where an adhesive (rubber-based adhesive) was applied by coating between the rubber layer and the reinforcement fiber layers and on a test piece where the adhesive was not applied.

Total Evaluation

Regarding the total evaluation, a test piece, which was evaluated that adhesive force is high without a coating step of adhesive, and tensile strength at break (TB) and elongation at break (EB) were excellent, is indicated by a symbol ○ in the Tables, and a test piece, which was evaluated that the coating step of adhesive is necessary, or adhesive force is low without a coating step of adhesive, is indicated by a symbol × in the Tables.

TABLE 1

| | Example | | | | | | |
|---|---|---|---|---|---|---|---|
| | 1 | 2 | 3 | 4 | 5 | 6 | 7 |
| TB (MPa) | 13.0 | 10.5 | 8.2 | 13.0 | 11.0 | 13.8 | 7.5 |
| EB (%) | 250 | 250 | 230 | 250 | 250 | 260 | 450 |
| Coating of Adhesive | None | None | None | None | None | None | None |
| Adhesive Force (kg/25 mm) | 2.5 | 2.8 | 2.8 | 2.8 | 2.8 | 2.4 | 2.5 |
| Peeling Status | ○ | ○ | ○ | ○ | ○ | ○ | ○ |
| Total Evaluation | ○ | ○ | ○ | ○ | ○ | ○ | ○ |

TABLE 2

| | Comparative Example | | | |
|---|---|---|---|---|
| | 1 | 2 | 3 | 4 |
| TB (MPa) | 14.0 | 13.0 | 14.0 | 13.3 |
| EB (%) | 260 | 300 | 270 | 500 |
| Coating of Adhesive | None Yes | None | None | None |
| Adhesive Force (kg/25 mm) | 0.1 1.5 | 0.4 | 0.8 | 0.2 |
| Peeling Status | × | × | × | × | × |

TABLE 2-continued

|  | Comparative Example | | | |
|---|---|---|---|---|
|  | 1 | 2 | 3 | 4 |
| Total Evaluation | x | x | x | x |

As is shown in the aforementioned results, when the rubber compositions of the Examples are used, since the destruction of the rubber layers occur, it is clear that the adhesive force is high by a large degree. Furthermore, since the tensile strength at break (TB) and elongation at break (EB) are nearly equivalent to those of the rubber compositions of Comparative Example 1 in which adhesive components (C component and D component) are not compounded, it is clear that intrinsic properties of the rubber are not degraded due to the inclusion of the adhesive components.

On the other hand, it is clear that since the rubber composition of Comparative Example 1 does not contain adhesive components, the adhesive force is low by a large degree. Furthermore, it is clear that even when the adhesives are applied by coating, the adhesive force is lower than that of the Examples, and peeling at the interface occurs. Regarding the rubber compositions of Comparative Examples 2 and 3, it is clear that since only one of the adhesive components is used, that is, the adhesive components are not used concurrently, the adhesive forces are low, and peeling at the interfaces occur. Regarding the rubber composition of Comparative Examples 4, it is clear that although the adhesive components are contained, since sulfur-based vulcanizing agents are used rather than a peroxide vulcanizing agent, the adhesive force is low, and peeling at the interface occurs. The reason for this result is believed that vulcanization rates of the sulfur-based vulcanizing agents are greater than those of the peroxide vulcanizing agents, and as a consequence, the rubber layer itself is vulcanized before adhesion to the reinforcement fiber layers which thereby degrades the adhesive force.

As described above, regarding the rubber composition according to the present invention, since the specified rubber is used as the base material, the resorcinol-based compound and the melamine resin are concurrently used as the adhesive components, and these components are vulcanized with the peroxide vulcanizing agent, superior adhesive force between the rubber composition and the material to be adhered can be achieved. The reason for this is believed that, as described above, the aforementioned resorcinol-based compound primarily functions as an adhesive, and the aforementioned melamine resin primarily functions as an adhesion adjuvant, and since the resorcinol-based compound is provided with $CH_2O$ from the melamine resin, a covalent bond is formed with the material to be adhered so as to improve the adhesive force.

Since the step of applying a coating of the adhesive is not necessary the so-called "adhesiveless" of the subject composition, the pot life of the adhesive need not be a concern, and concentration control is not necessary, so that stability in productivity is improved. In addition, since an organic solvent as a dilution solvent of the adhesive is not used, problems of environmental pollution, etc are reduced. Furthermore, since vulcanization is performed using the peroxide vulcanizing agents rather than the conventional sulfur-based vulcanizing agents, zinc oxide need not be used (zinc-free). Consequently, when the rubber composition according to the present invention is used as the material for the inner layer of the hose, problems of conventional hoses, such as clogging of the hose and leakage of the liquid at the seal portion, can be eliminated.

Regarding the hose produced by adhering the rubber composition according to the present invention and the reinforcement layer, since the adhesive force between the rubber layer and the reinforcement layer is improved compared to that in the case where adhesion is performed using a conventional adhesive solution, deviation of the reinforcement layer is reduced. As a result, a change rate of the outer diameter of the hose is reduced, and gaps at the connection portion of pipes, etc., are eliminated, so that the sealing performance of the hose is improved by a large degree.

When the weight ratio of the resorcinol-based compound (C) to the melamine resin (D) is within a specified range, the adhesive force between the rubber composition and the material to be adhered is improved further.

When the weight ratio of the resorcinol-based compound (C) relative to the specified rubber (A) is within a specified range, the adhesive force between the rubber composition and the material to be adhered also is improved.

What is claimed is:
1. A rubber composition consisting essentially of:

(A) a rubber comprising at least one of an ethylene-propylene-diene terpolymer and an ethylene-propylene copolymer;

(B) a rubber peroxide crosslinking agent;

(C) a resorcinol-based compound selected from the group consisting of those represented by the following general formulae (1) to (3); and

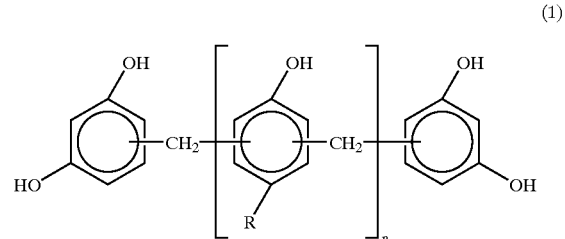

(1)

wherein R represents a hydrocarbon group and n represents a number of 0 to 3;

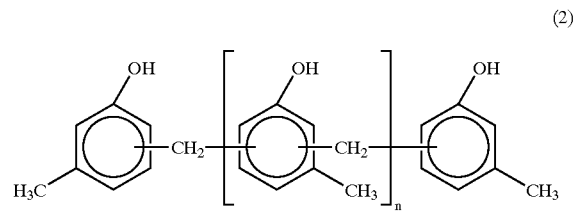

(2)

wherein n represents a number of 0 to 3;

(3)

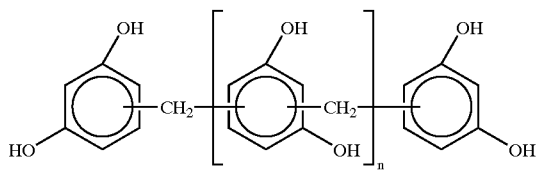

wherein n represents a number of 0 to 3; and (D) a melamine resin.

2. A rubber composition according to claim 1, wherein a weight ratio of (C) to (D) is within the range of 1/0.5 to 1/2.

3. A rubber composition according to claim 1, wherein a weight ratio of (C) is within the range of.0.1 to 10 parts by weight relative to 100 parts by weight of (A).

4. A rubber composition according to claim 2, wherein a weight ratio of (C) is within the range of 0.1 to 10 parts by weight relative to 100 parts by weight of (A).

5. A rubber composition according to claim 1, the melamine resin of the component (D) is the methylated formaldehyde-melamine polymer represented by the following formula 4:

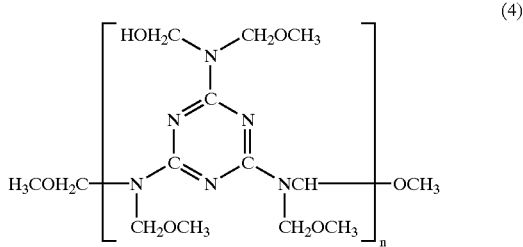

wherein n represents a positive number.

* * * * *